(12) United States Patent
Suzuki

(10) Patent No.: US 10,302,297 B2
(45) Date of Patent: May 28, 2019

(54) SMOKELESS INCINERATOR AND SYSTEM USING SAME

(71) Applicant: SEC Elevator Co., Ltd., Taito-ku, Tokyo (JP)

(72) Inventor: Takao Suzuki, Tokyo (JP)

(73) Assignee: SEC Elevator Co., Ltd., Tokyo (JP)

(*) Notice: Subject to any disclaimer, the term of this patent is extended or adjusted under 35 U.S.C. 154(b) by 0 days.

(21) Appl. No.: 15/565,858

(22) PCT Filed: Jul. 21, 2015

(86) PCT No.: PCT/JP2015/070649
§ 371 (c)(1),
(2) Date: Oct. 11, 2017

(87) PCT Pub. No.: WO2017/010015
PCT Pub. Date: Jan. 19, 2017

(65) Prior Publication Data
US 2018/0112868 A1    Apr. 26, 2018

(30) Foreign Application Priority Data

Jul. 15, 2015   (JP) .................................. 2015-141295

(51) Int. Cl.
*F23C 6/04*   (2006.01)
*F23J 15/00*  (2006.01)
(Continued)

(52) U.S. Cl.
CPC ................ *F23C 6/04* (2013.01); *F23C 99/00* (2013.01); *F23G 5/16* (2013.01); *F23G 5/165* (2013.01);
(Continued)

(58) Field of Classification Search
CPC ....................................................... F23C 6/64
See application file for complete search history.

(56) References Cited

U.S. PATENT DOCUMENTS

| | | | | |
|---|---|---|---|---|
| 5,359,946 A * | 11/1994 | Asoh | ...................... | B01D 53/68 110/216 |
| 5,397,551 A * | 3/1995 | Won Sam | ............. | F23G 5/0276 422/140 |
| 2005/0039649 A1* | 2/2005 | Song | ........................ | F23G 5/165 110/235 |

FOREIGN PATENT DOCUMENTS

| JP | 56-23626 A | 3/1981 |
|---|---|---|
| JP | 5-240417 A | 9/1993 |

(Continued)

*Primary Examiner* — Nathaniel Herzfeld
(74) *Attorney, Agent, or Firm* — Berenato & White, LLC

(57) ABSTRACT

A smokeless incinerator burns unburned gas to inhibit generation of black smoke. The incinerator contains a first combustion chamber with a main combustor having firebrick walls into which waste is thrown and an auxiliary burner for burning the waste. A water cooling jacket is located above the main combustor. A second combustion chamber is located on top of the first combustion chamber and has a re-burning burner for unburned gas. A filter-equipped combustion chamber is aligned with and adjacent the second combustion chamber and has a ceramic filter. A third combustion chamber is aligned with and adjacent to the filter-equipped combustion chamber and has a dust collection cyclone. A fourth combustion chamber is located on top of the third combustion chamber and has a re-burning burner for unburned gas. An exhaust stack is located on top of the fourth combustion chamber and has a forced exhaust.

15 Claims, 9 Drawing Sheets

(51) Int. Cl.
*F23L 17/00* (2006.01)
*F23M 5/00* (2006.01)
*F23M 5/08* (2006.01)
*F23C 99/00* (2006.01)
*F23G 5/16* (2006.01)
*F23G 5/46* (2006.01)
*F23J 15/02* (2006.01)
*F23L 17/16* (2006.01)

(52) U.S. Cl.
CPC ............ *F23G 5/46* (2013.01); *F23J 15/00* (2013.01); *F23J 15/02* (2013.01); *F23J 15/025* (2013.01); *F23J 15/027* (2013.01); *F23L 17/00* (2013.01); *F23L 17/16* (2013.01); *F23M 5/00* (2013.01); *F23M 5/08* (2013.01); *F23J 2217/104* (2013.01); *Y02E 20/12* (2013.01)

(56) References Cited

FOREIGN PATENT DOCUMENTS

| JP | 7-171329 A | | 7/1995 |
|---|---|---|---|
| JP | 9-42638 A | | 2/1997 |
| JP | 09236219 A | * | 9/1997 |
| JP | 09287722 A | * | 11/1997 |
| JP | 10-89641 A | | 4/1998 |
| JP | 10-148313 A | | 6/1998 |
| JP | 10267236 A | * | 10/1998 |
| JP | 2000-146140 A | | 5/2000 |
| JP | 2000-240916 A | | 9/2000 |
| JP | 2002089814 A | * | 3/2002 |
| JP | 2002303407 A | * | 10/2002 |
| JP | 2003120913 A | * | 4/2003 |
| JP | 4120422 B2 | | 9/2004 |
| JP | 2004333082 A | * | 11/2004 |
| JP | 2005016928 A | * | 1/2005 |
| JP | 2005061717 A | * | 3/2005 |
| JP | 2005127535 A | * | 5/2005 |
| JP | 2005249306 A | * | 9/2005 |
| JP | 3795847 B2 | | 7/2006 |
| JP | 2008-122021 A | | 5/2008 |
| JP | 2008-136919 A | | 6/2008 |
| JP | 2009085452 A | * | 4/2009 |
| JP | 2010-185631 A | | 8/2010 |
| JP | 2014-163170 A | | 9/2014 |
| JP | 5625205 B2 | | 11/2014 |

* cited by examiner

SMOKELESS INCINERATOR AND SYSTEM USING SAME

CROSS-REFERENCE TO RELATED APPLICATIONS AND CLAIM TO PRIORITY

This application is a national stage application of International Application No. PCT/JP2015/070649 filed Jul. 21, 2015, which claims priority to Japanese Patent Application No. 2015-141295 filed Jul. 15, 2015, the disclosures of which are incorporated herein by reference and to which priority is claimed.

FIELD OF THE INVENTION

The present invention relates to a smokeless incinerator without generating dioxins and carbon monoxide and to a power generation system or a heat exchange system using the smokeless incinerator.

BACKGROUND OF THE INVENTION

Various technologies are disclosed in relation to incinerators into which wastes are thrown successively. Wastes to be burned are organic wastes dumped from households and business offices including garbage, paper, plants, rubber, plastics, and so on.

In the incinerator arranged to inhibit generation of dioxins, an auxiliary burner is used for burning at over 800° C. in the first combustion chamber (Patent Document 1). It is general to supply in the first combustion chamber an appropriate amount of air for inhibiting carbon monoxide from being generated due to incomplete burning. Automatic control of the amount of air to be supplied is also publicly known well. In another incinerator, the first combustion chamber is provided with a water cooling jacket for protecting furnace walls (Patent Document 2).

RELATED ART DOCUMENTS

Patent Documents

Patent Document 1: Japanese Patent No. 5625205
Patent Document 2: Japanese Patent No. 4120422
Patent Document 3: Japanese Unexamined Patent Application Publication No. 2008-136919

SUMMARY OF THE INVENTION

Technical Problem

Small incinerators are susceptible to temperature fall and local lack of air caused by dumping overloaded organic wastes into their first combustion chambers that are smaller than those of large incinerators. Inadequate agitation with unburned gas also causes lack of air even with sufficient air existing in the furnace. Meanwhile, an excess amount of air causes temperature fall. As a result of these, black smoke containing unburned gas is generated. The black gas contains dioxins and carbon monoxide. With advanced countermeasure recently against dioxins for small incinerators, providing a second combustion chamber is stressed for re-burning the gas that has not been completely burned in a first combustion chamber. In reality however, a smokeless small incinerator with completely eliminating black smoke has not been achieved yet.

In some cases, excessive burning to deal with overloaded organic wastes in the first combustion chamber exerts pressure excessively on the second combustion chamber, damaging frequently burners used in the first and second combustion chambers.

If a water cooling jacket is provided for protecting furnace material in the first combustion chamber against high temperature, the chamber's temperature is easy to fall, which may lead to generation of black smoke containing dioxins.

In view of the above problems, the present invention aims to provide a smokeless incinerator in which a first combustion chamber is sufficiently kept at high temperature while generation of black smoke is inhibited by completely burning unburned gas without damaging a burner of the chamber, and to further provide a system thereof combined with a power generator and/or a heat exchanger.

Solution to Problem

The present invention provides the following configurations with a view to solve the above problems. Reference numerals in parentheses used herein are for the purpose of reference and shown in the attached drawings to be described later.

According to a first aspect of the present invention, a smokeless incinerator contains: a first combustion chamber (A) provided with a main combustor (A1) into which wastes are thrown having firebrick walls (A12) and an auxiliary burner (A31) for supporting burning of the wastes, and a water cooling jacket (A2) that is located above the main combustor (A1) and has water cooling jacket walls (A27); a second combustion chamber (B) that is located on top of the first combustion chamber (A) and has a re-burning burner (B1) for burning unburned gas; a filter-equipped combustion chamber (C) that is aligned with and adjacent to the second combustion chamber (B) and has a ceramic filter (C1); a third combustion chamber (D) that is aligned with and adjacent to the filter-equipped combustion chamber (C) and has a dust collection cyclone (D3); a fourth combustion chamber (E) that is located on top of the third combustion chamber (D) and has a re-burning burner (E1) for burning unburned gas; and an exhaust stack (F) that is located on top of the fourth combustion chamber (E) and has a unit of forced exhaust (F2, F5).

In the first aspect, the re-burning burner (B1) of the second combustion chamber (B) is fixed obliquely on a side face adjacent to an opposed face to the filter-equipped combustion chamber (C) at an acute angle ($\alpha$) with respect to a direction toward the filter-equipped combustion chamber (C).

In the first aspect, the re-burning burner (B1) of the second combustion chamber (B) is capable of heating the filter-equipped combustion chamber (C) and the third combustion chamber (D).

In the first aspect, the second combustion chamber (B), the filter-equipped combustion chamber (C), the third combustion chamber (D), and the fourth combustion chamber (E) have respective porous ceramic walls (B2, C2, D2, E2).

In the first aspect, the first combustion chamber (A) has inside a plurality of air nozzles (A11) extending vertically for supplying air.

In the first aspect, the main combustor (A1) of the first combustion chamber (A) has a smoldering air nozzle (A10) at a lower portion for supplying air necessary to smolder.

In the first aspect, the main combustor (A1) of the first combustion chamber (A) has a re-burning burner (A32) above the auxiliary burner (A31).

In the first aspect, the water cooling jacket (A2) of the first combustion chamber (A) has a re-burning burner (A33).

According to a second aspect of the present invention, a power generation system contains the smokeless incinerator (1) in the first aspect and a generator (G) arranged to generate electricity with steam supplied from the water cooling jacket (A2) of the first combustion chamber (A).

According to a third aspect of the present invention, a heat exchange system contains the smokeless incinerator (1) in the first aspect and a heat exchanger (H) arranged to exchange heat with exhaust gas supplied from the exhaust stack (F).

Effects of the Invention

In the smokeless incinerator according to the present invention, the configuration of the first combustion chamber having both the main combustor and the water cooling jacket thereabove makes it possible for the main combustor to keep high temperature sufficient for complete burning while preventing overheat with the water cooling jacket, achieving stable temperature kept in the chamber. This enables contribution to smokelessness.

In the first combustion chamber, a minimum amount of air necessary for burning is supplied to the sealed furnace so as to mix with pyrolysis gas generated when burning, and the upper portion of the furnace is used as a space for stagnation and re-burning of unburned gas, which stabilizes the speed of gasification for well-balanced burning. Once the state inside the furnace is stabilized, efficient complete burning is achieved only with air.

The sequential configuration of the second combustion chamber, the filter-equipped combustion chamber, and the third combustion chamber in horizontal direction, along with the re-burning burner that is provided in the second combustion chamber and capable of heating all the three chambers, allows re-burning of unburned gas in exhaust gas efficiently with saving energy. This enables contribution to smokelessness.

In the third combustion chamber having the dust collection cyclone, dust is collected under high temperature by heating so as to burn particulates being collected, contributing to smokelessness as well as reducing ash of collected dust.

DETAILED DESCRIPTION OF THE PREFERRED EMBODIMENT(S)

A preferred embodiment of the present invention will be described with reference to the accompanying drawings. The smokeless incinerator according to the present invention is preferable to be used, in particular, as a small incinerator in that smokelessness can be achieved even in such small incinerator which is susceptible to temperature fall and local lack of air due to its small combustion chamber. Meanwhile, in a large incinerator, complete burning is relatively easily achieved with sufficient air supply because its combustion chamber is large enough for unburned gas to stagnate for a long time of period. The present invention is certainly applicable to such large incinerator.

Accordingly, the present invention should not be considered as limiting any size of device, specific purpose of use, and waste to be burned, but should be considered as applicable to various incinerators. When the present invention is applied, changes and variations in dimension and material may be made if necessary according to the size, purpose of use, and waste to be burned in the applied incinerator without departing from the features of the present invention.

Wastes to be burned in the incinerator of the present invention are basically organic substances, among which are, for example, organic wastes dumped from households and business offices including garbage, paper, plants, rubber, plastics, and so on. However, inorganic substances and metal may be included insomuch as not affecting burning operation.

Reference will now be made to an embodiment of the present invention with reference to an example applied to a small incinerator.

Figure 1:
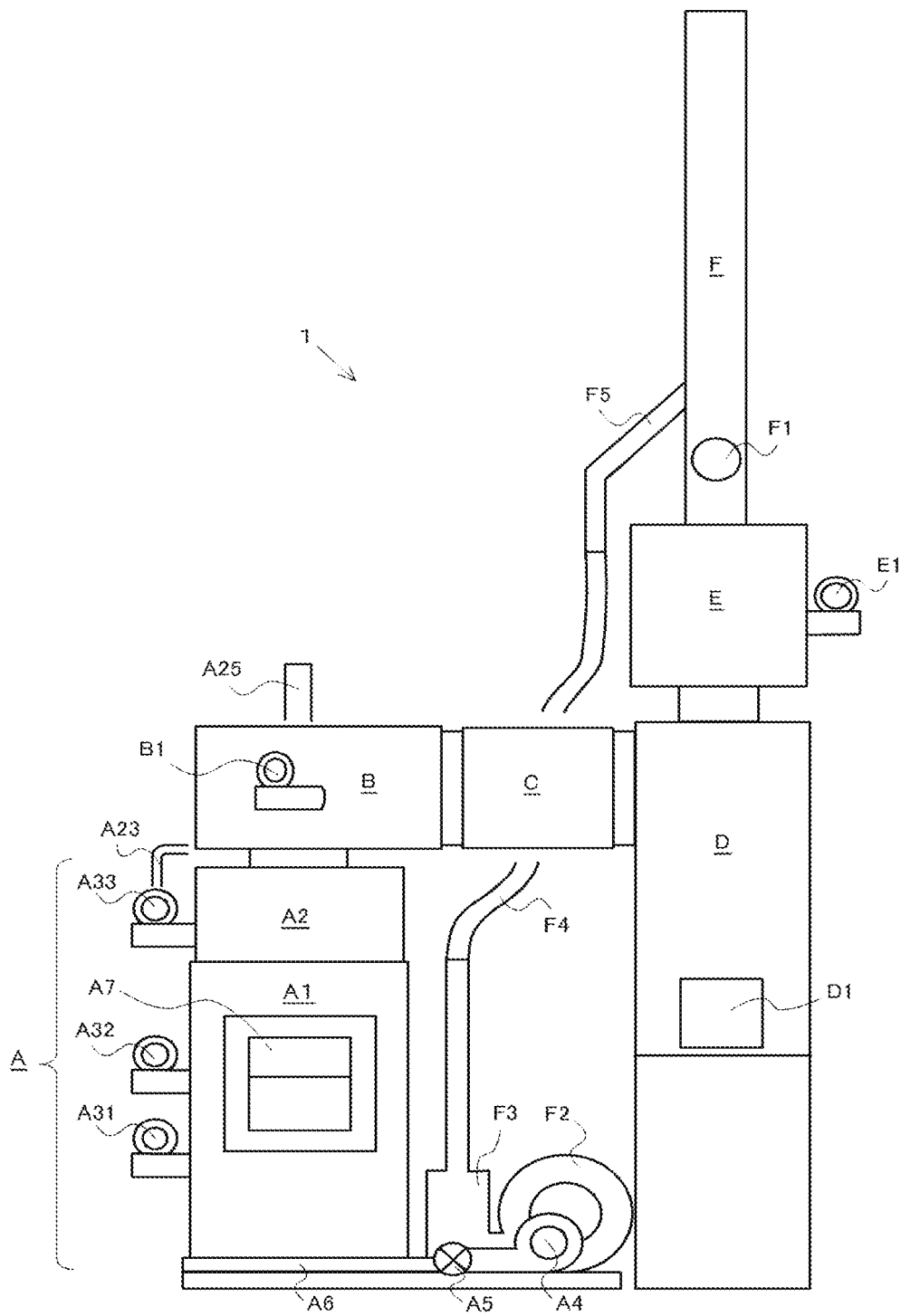
FIG. 1 is a schematic front view of a smokeless incinerator according to an embodiment of the present invention.
Figure 2:
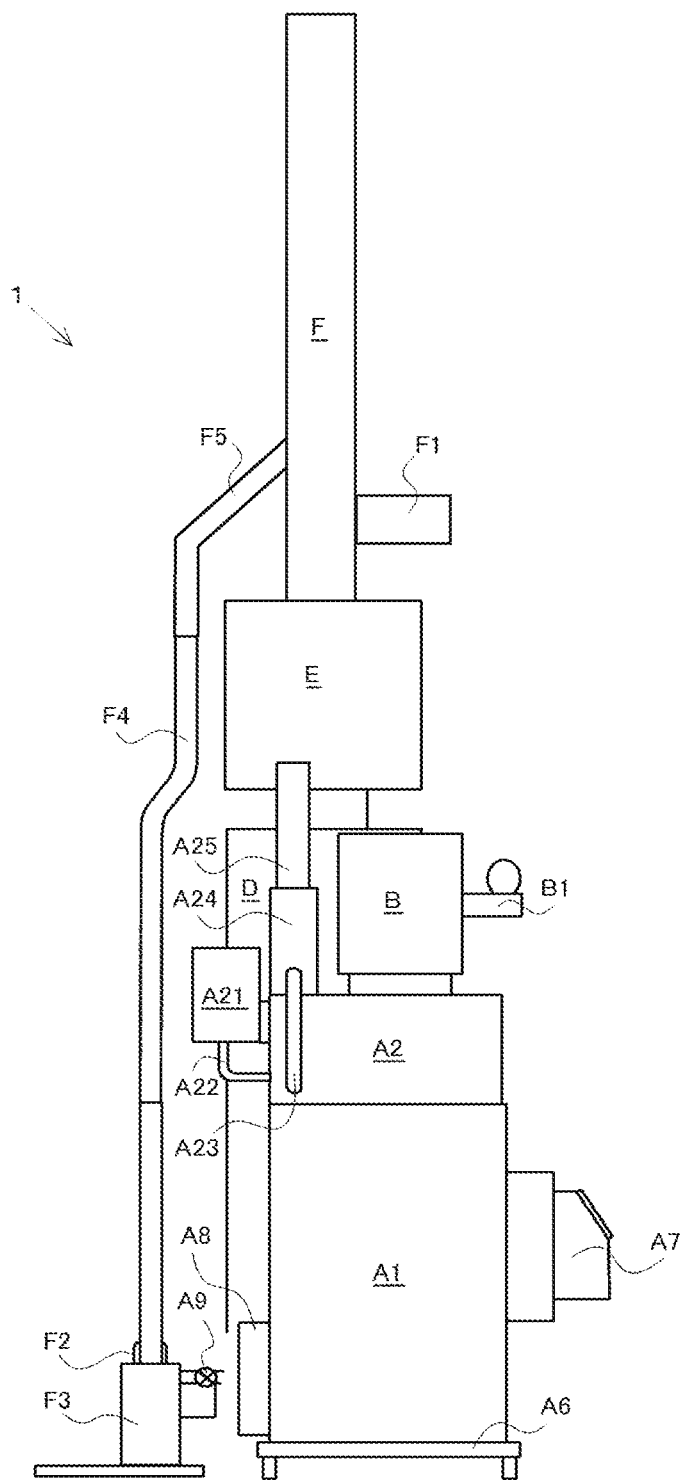
FIG. 2 is a left side view of the smokeless incinerator shown in FIG. 1.
Figure 3:
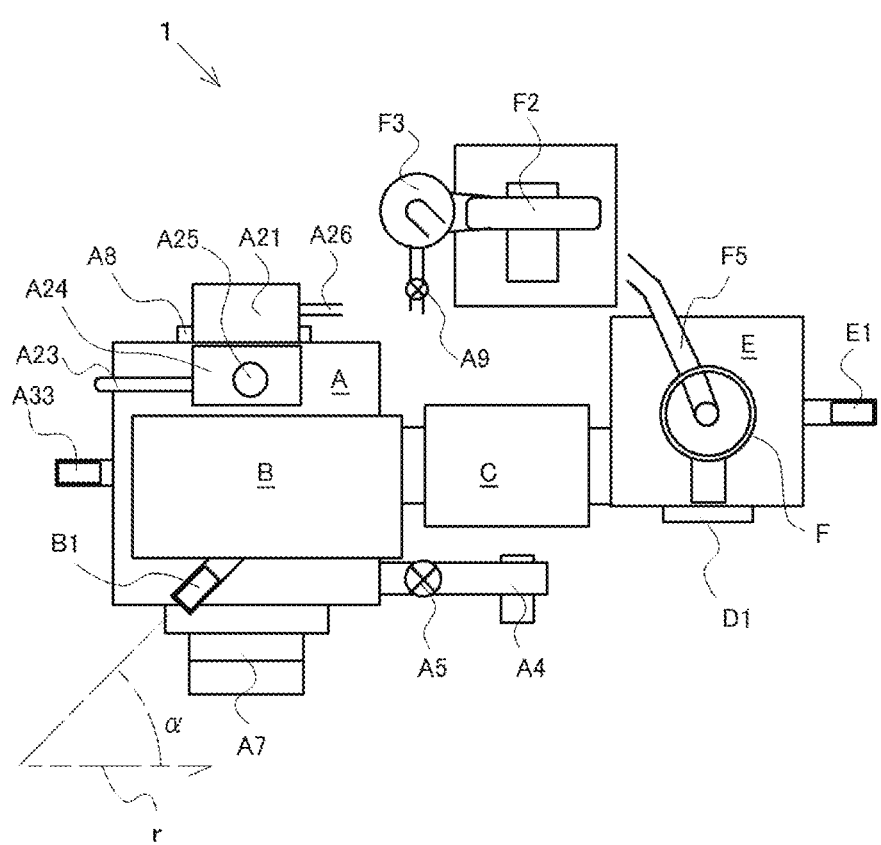
FIG. 3 is a plan view of the smokeless incinerator shown in FIG. 1.
Figure 4:
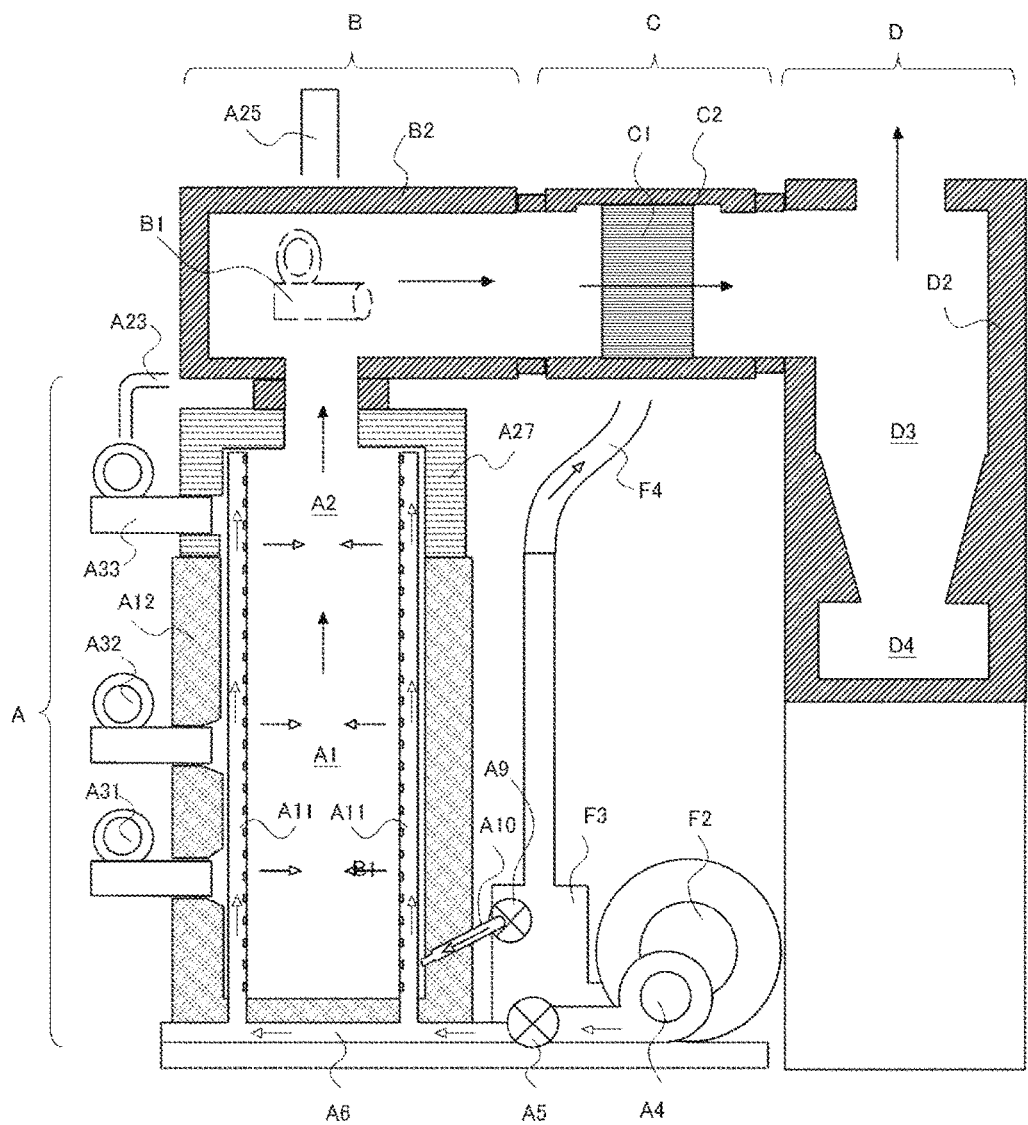
FIG. 4 is a front cross-sectional view schematically showing a main part of the smokeless incinerator.
Figure 5:
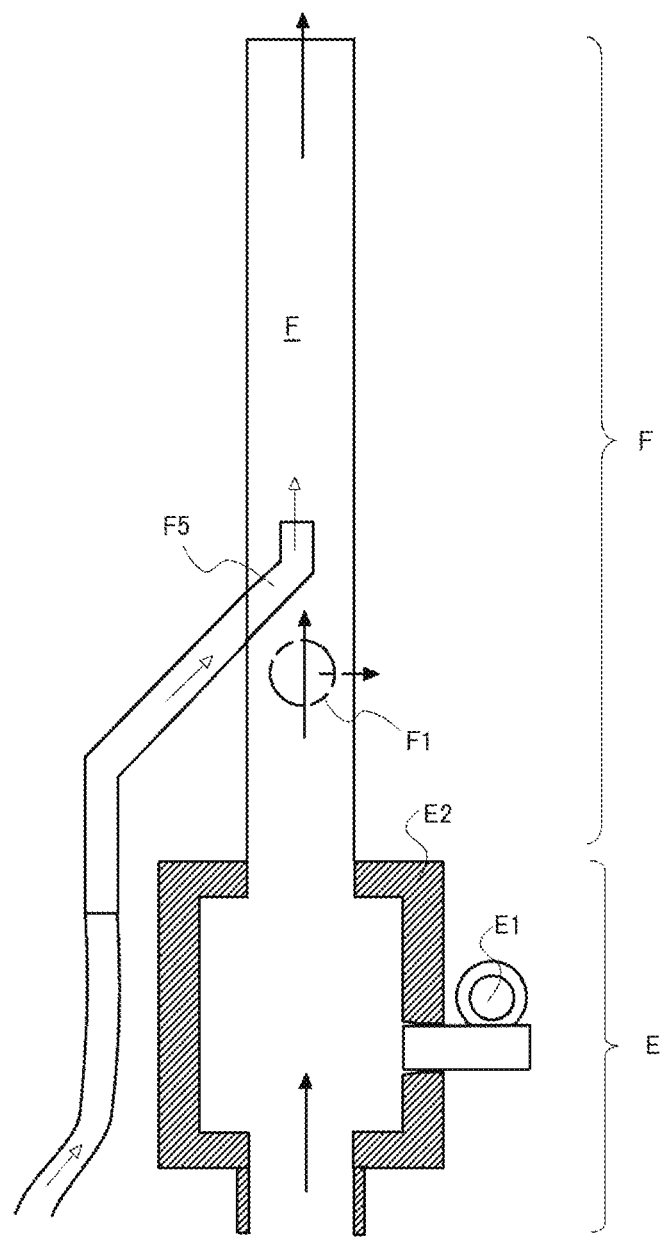
FIG. 5 is a front cross-sectional view schematically showing another main part of the smokeless incinerator.

FIG. 1 is a schematic front view of a smokeless incinerator 1 as an embodiment of the present invention. FIG. 2 is a left side view and FIG. 3 is a plan view of the smokeless incinerator 1. FIG. 4 is a front cross-sectional view schematically showing a main part of the smokeless incinerator 1. FIG. 5 is a front cross-sectional view schematically showing another main part of the smokeless incinerator 1. The configuration of the smokeless incinerator 1 will be described hereinafter with reference to FIGS. 1 to 5.

As shown in FIG. 1, the smokeless incinerator 1 is provided with, as main parts, a first combustion chamber A, a second combustion chamber B, a filter-equipped combustion chamber C, a third combustion chamber D, a fourth combustion chamber E, and an exhaust stack F. The second combustion chamber B is located on top of the first combustion chamber A. The filter-equipped combustion chamber C and the third combustion chamber D are located in series lateral to the second combustion chamber B. The fourth combustion chamber E is located on top of the third combustion chamber D. The exhaust stack F is located on top of the fourth combustion chamber E. Outer surfaces of each chamber are basically covered with steel plate.

The following are configurations of each of the chambers.

<First Combustion Chamber A>

The first combustion chamber A has one almost cuboid inner space as shown in FIG. 4. The first combustion chamber A is configured with two parts arranged vertically, one is a main combustor A1 at the lower portion, the other is a water cooling jacket A2 at the upper portion. The main combustor A1 and the water cooling jacket A2 are distinguished from each other by the difference of wall structure.

The main combustor A1 is a space for burning wastes first and has a slot A7 on the front, through which wastes are thrown. The slot A7 is arranged in such a way as to perform successive throwing and is, for example, a double-structured rotary damper. This type of damper has double structure to prevent temperature fall in the first combustion chamber A when throwing the wastes and has ceramic heat insulator at the inlet of the main combustor A1 (not shown), which is known well. An ash outlet A8 is provided on the back side of the main combustor A1.

The main combustor A1 has firebrick walls A12 with a predetermined thickness inside the steel plate as shown in FIG. 4. The firebrick walls A12 are arranged on both side walls and the bottom wall. The inner space of the main combustor A1 is kept at 800° C. or more, preferably at 850° C. to 900° C. so as to inhibit dioxins. The firebrick walls A12 serve to prevent temperature fall in the inner space when burning, making it possible to perform burning without generating dioxins, and to facilitate re-burning unburned gas in the exhaust gas caused by gasification. Black arrows shown in FIG. 4 indicate flow of exhaust gas.

The material and thickness of the firebrick walls A12 are bearable to the temperature of the inner space. As the firebrick walls A12, for example, chamotte brick or high-alumina brick etc. is used. The chamotte brick is inexpensive so suitable for a small incinerator (for example, fire brick No. "SK34" with usable maximum temperature of 1380° C. made by KAGATAIKA RENGA). The firebrick walls A12 also serve to secure exterior insulation and to suppress deformation and deterioration of the surface steel plate.

An auxiliary burner A31 is provided on the side wall of the main combustor A1 for first ignition for burning wastes. In most cases, the wastes that once start to burn keep burning by self-sustained combustion. It is possible for the main combustor A1 to reach the temperature required for burning only with self-sustained combustion of the wastes. That is, little fuel is consumed for burning. The auxiliary burner A31 is used for controlling gasification of the wastes if necessary in accordance with burning condition.

It is preferable that a re-burning burner A32 is provided on the side wall above the auxiliary burner A31. The re-burning burner A32 is used for re-burning unburned gas in accordance with stagnant condition of unburned gas in the main combustor A1 (for example, when black smoke arises). Re-burning of such unburned gas turns black smoke into colorless and inhibits generation of bad odor.

A water cooling jacket A2 is located above the main combustor A1 and serves to prevent excess temperature rise in the chamber A1. The firebrick walls A12 of the main combustor A1 are suitable for keeping high temperature but at the same time have a disadvantage that its temperature is easy to rise excessively. In that case, excess burning causes lack of air, which leads to incomplete burning and results in generation of black smoke. For preventing the case, the water cooling jacket A2 having water cooling jacket walls A27 is provided. The water cooling jacket walls A27 have a double wall structure wherein a gap for flowing water is arranged between the surface steel plate and another steel plate. The water cooling jacket walls A27 absorb excess heat of the main combustor A1 in order to stably keep its temperature, enabling a stabilized speed of gasification for well-balanced burning.

Conventionally, water cooling jacket walls are arranged so as to surround first combustion chambers entirely for protecting them, which causes a problem of generating dioxins resulting from incomplete burning due to temperature fall in the main combustors.

A water tank A21 as shown in FIGS. 2 and 3 is used to supply water to the water cooling jacket walls A27 of the water cooling jacket A2. The water is supplied externally via a water supply port A26 to the water tank A21, and is fed to the water cooling jacket walls A27 through a water supply pipe A22. The water flowing through the water cooling jacket walls A27 turns into steam by being exposed to high temperature and is fed to an expansion tank A24 through a steam feeding pipe A23 as shown in FIG. 2. The steam is cooled to an adequate temperature in the expansion tank A24 and discharged through a steam cylinder A25 extending upward.

The water cooling jacket A2 has on the side wall a re-burning burner A33 which is, similar to the re-burning burner A32 of the main combustor A1, used for re-burning unburned gas in accordance with stagnant condition of unburned gas in the rising exhaust gas. Re-burning of such unburned gas inhibits generation of bad odor.

The inner space of the first combustion chamber A is provided with air nozzles A11 extending vertically from the bottom to the top of the space as shown FIG. 4. In this example, four air nozzles A11 are arranged at four corners of the inner space. There are a number of air injection holes on the surface of the air nozzles A11. White arrows shown in FIG. 4 indicate flow of air.

The air to be supplied to the air nozzles is fed from a turbo blower A4 via a valve A5 and stored in an air tank A6 arranged under the bottom of the main combustor A1. Each of the air nozzles A11 is communicated with the air tank A6. Controlling the valve A5 enables feeding air only in the amount required for burning. As well as supplying oxygen required for burning the wastes, the air injected into the inner space is mixed with unburned gas to become a mixed gas for efficient complete burning.

A smoldering air nozzle A10 may be provided in the vicinity of the bottom of the main combustor A1. The smoldering air nozzle A10 facilitates smoldering in which wastes remaining in solid state are burned to red heat. The air for smoldering in the example is accordingly supplied from a high-pressure turbo blower F2, which will be described later, via a valve A9.

<Second Combustion Chamber B>

A second combustion chamber B is arranged above the first combustion chamber A, or on top of the water cooling jacket A2. The outlet at the center of top face of the water cooling jacket A2 and the inlet at the center of bottom face of the second combustion chamber B are connected via a short duct provided therebetween.

The second combustion chamber B, as shown in FIG. 4, is provided with porous ceramic walls B2 having a predetermined thickness inside the surface steel plate. The porous ceramic walls B2 are made of porous ceramic with fire resistant temperature of 1250° C. or more. Porous ceramic having fine pores is capable of storing heat, or retaining heat, in the vicinity of the inner space, while insulating heat in the vicinity of the outer surface. The surface facing the inner space radiates radiation heat (far infrared) triggered by high temperature. There is a product of brick made by hardening ceramic powder as one of porous ceramic, for example, "Free Fire Brick" (max fire resistant temperature of 1250° C.) made by Kato Electric Furnace Material may be used.

The second combustion chamber B is provided with a re-burning burner B1 that is used accordingly for re-burning unburned gas in exhaust gas. The re-burning burner B1 is fixed on the side face adjacent to an opposed face to the filter-equipped combustion chamber C as shown in FIG. 3 (front face in the shown example). And the re-burning burner B1 is fixed obliquely at an acute angle α with respect to a direction r toward the filter-equipped combustion chamber C. It is obvious that this way of fixing is very useful in terms of protecting the re-burning burner B1 from being damaged. If the re-burning burner B1 is fixed on the opposite side of the opposed face to the filter-equipped combustion chamber C, or fixed at a right angle with respect to the side face, the re-burning burner B1 was easy to be damaged due to pressure of exhaust gas discharged from the first combustion chamber. This way of fixing on the predetermined side obliquely prevents the re-burning burner B1 from being damaged.

The outlet of the second combustion chamber B is on the opposed face to the filter-equipped combustion chamber C. Accordingly, upward flow of exhaust gas entering from the inlet at the lower portion of the second combustion chamber B is bent horizontally, slowing down the speed of exhaust gas and prolonging its stagnant time. Consequently, the time for re-burning unburned gas is sufficiently secured.

The re-burning burner B1 is capable of heating not only the second combustion chamber B but also the filter-equipped combustion chamber C and the third combustion chamber D, details for which will be described later. This is because the second combustion chamber B, the filter-equipped combustion chamber C, and the third combustion chamber D are sequentially aligned in a horizontal line. In this regard, each inner space of the three chambers having the same size of cross section, from the second combustion chamber B to the inlet of the third combustion chamber D, is connected including portions of short duct therebetween. The portions of short duct are provided with porous ceramic walls. That is, one inner space in the shape of cuboid is formed from the second combustion chamber B to the upper part of the third combustion chamber D. The arrangement and configuration of three chambers B, C, and D as described above makes it possible that the re-burning burner B1 alone covers all of the three chambers for heating.

<Filter-Equipped Combustion Chamber C>
The filter-equipped combustion chamber C is arranged adjacent to the second combustion chamber B. The filter-equipped combustion chamber C is provided with a porous ceramic wall C2 having a predetermined thickness inside the steel plate of outer surfaces (top and bottom faces and both sides) as shown in FIG. 4.

A ceramic filter C1 is arranged at the center of the filter-equipped combustion chamber C in such a way as to compartment the inner space of the filter-equipped combustion chamber C into an inlet part and an outlet part. So exhaust gas passes through the ceramic filter C1. As described above, the filter-equipped combustion chamber C together with the ceramic filter C1 is heated with the re-burning burner B1 of the second combustion chamber B. The ceramic filter C1 serves to absorb and remove particulates in exhaust gas, and helps to facilitate re-burning unburned gas in exhaust gas by way of being heated to a high temperature. Re-burning is further facilitated with radiation heat (far infrared) of the porous ceramic wall C2.

Figure 6:
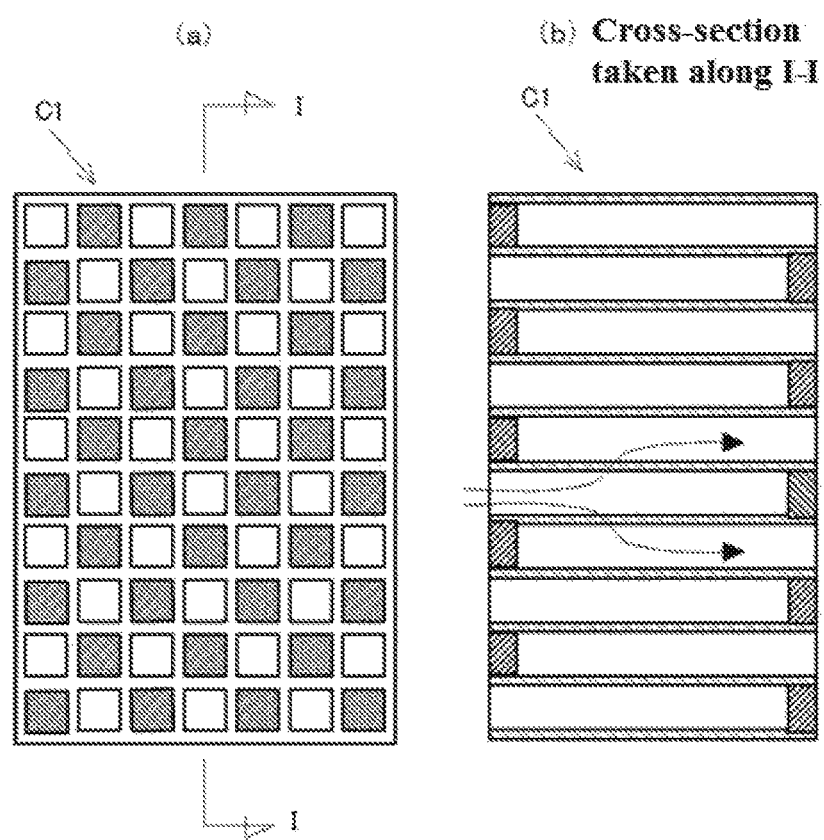
FIG. 6 shows an example of a ceramic filter: (a) shows an exhaust gas inflow surface; and (b) is a cross-sectional view taken along the line I-I of (a).

FIG. 6 shows an example of a ceramic filter C1: (a) shows a side view of the ceramic filter C1 and FIG. 6(b) is a cross-sectional view taken along the line I-I of (a). Black arrows indicates flow of exhaust gas. This type of ceramic filter is publicly known and disclosed in, for example, Patent Document 3. As ceramic filter C1, for example, "ceramic pipe" made by ISOLITE Insulating Products Co., Ltd may be used.

<Third Combustion Chamber D>
The third combustion chamber D is arranged adjacent to the side of filter-equipped combustion chamber C opposite to the second combustion chamber B. The third combustion chamber D is provided with a porous ceramic wall D2 having a predetermined thickness inside the steel plate of outer surfaces as shown in FIG. 4.

The third combustion chamber D has a dust collection cyclone D3 in the shape of cone upside down. A dust collection chamber D4 having a predetermined size is arranged at the lower part of the dust collection cyclone D3. An ash outlet D1 is provided at the front of the dust collection chamber D4.

The dust collection cyclone D3 turns exhaust gas to prolong its stagnant time and collects particulates in the exhaust gas by means of centrifugal force. The collected particulates go down to and accumulate in the dust collection chamber D4.

As described above, the third combustion chamber D is heated with the re-burning burner B1 of the second combustion chamber B to a high temperature, facilitating re-burning of unburned gas in the exhaust gas. Re-burning is further facilitated with radiation heat (far infrared) of the porous ceramic wall D2. The exhaust gas in which particulates are removed and unburned gas is re-burned is sucked with forced exhaust flow, which will be described later, and guided to a fourth combustion chamber E via the outlet provided on the top face of the third combustion chamber D.

<Fourth Combustion Chamber E>
The fourth combustion chamber E is located on top of the third combustion chamber D and provided with a porous ceramic wall E2 having a predetermined thickness inside the steel plate of outer surfaces as shown in FIG. 5.

The fourth combustion chamber E has a re-burning burner E1 on its side wall. The re-burning burner E1 is used for re-burning unburned gas if left in the exhaust gas at this point. Measurements at a measuring port F1 provided on an exhaust stack F, which will be described later, detect if unburned gas is left at this point. If unburned gas is detected, the fourth combustion chamber E is heated with the re-burning burner E1 to re-burn the gas. Re-burning is further facilitated with radiation heat (far infrared) of the porous ceramic wall E2.

<Exhaust Stack F>
The exhaust stack F is a cylindrical steal member extending upward from the outlet of the fourth combustion chamber E on its top face and is preferably processed with hot-dip aluminum plating for enhancing heat and corrosion resistance.

A forced exhaust pipe F5 is attached in the middle of the exhaust stack F in the longitudinal direction. The upper end of the forced exhaust pipe F5 penetrates the wall of the exhaust stack F and has an opening facing upward on the central axis of the exhaust stack F. The lower end of the forced exhaust pipe F5 is connected to a first end of an air feeding pipe F4. A second end of the air feeding pipe F4 is connected to an air chamber F3 that is provided at a blowing port of the high-pressure turbo blower F2.

When the high-pressure turbo blower F2 starts operating, high pressure air is injected upward through the upper end of the forced exhaust pipe F5 to form a strong flow of air going upward in the exhaust stack F. The flow of air forces the exhaust gas from the fourth combustion chamber to rise by using pulling force. This forced flow of air generated with the forced exhaust pipe F5 functions to guide each exhaust gas that is generated at each stage prior to the fourth combustion chamber E to a predetermined direction.

The exhaust gas, in this way, is discharged in the atmosphere through the upper end of the exhaust stack F. Since there is little unburned gas left at this stage, colorless and odorless exhaust gas is discharged.

The exhaust stack F has the measuring port F1 at a position lower than the forced exhaust pipe F5. The measuring port F1 is used for taking out some of the exhaust gas fed from the fourth combustion chamber E for the purpose of various measurements in the composition of the gas. The measured results are transmitted to a controlling section (not shown) that controls the re-burning burner E1, etc. based on the results.

Figure 7:
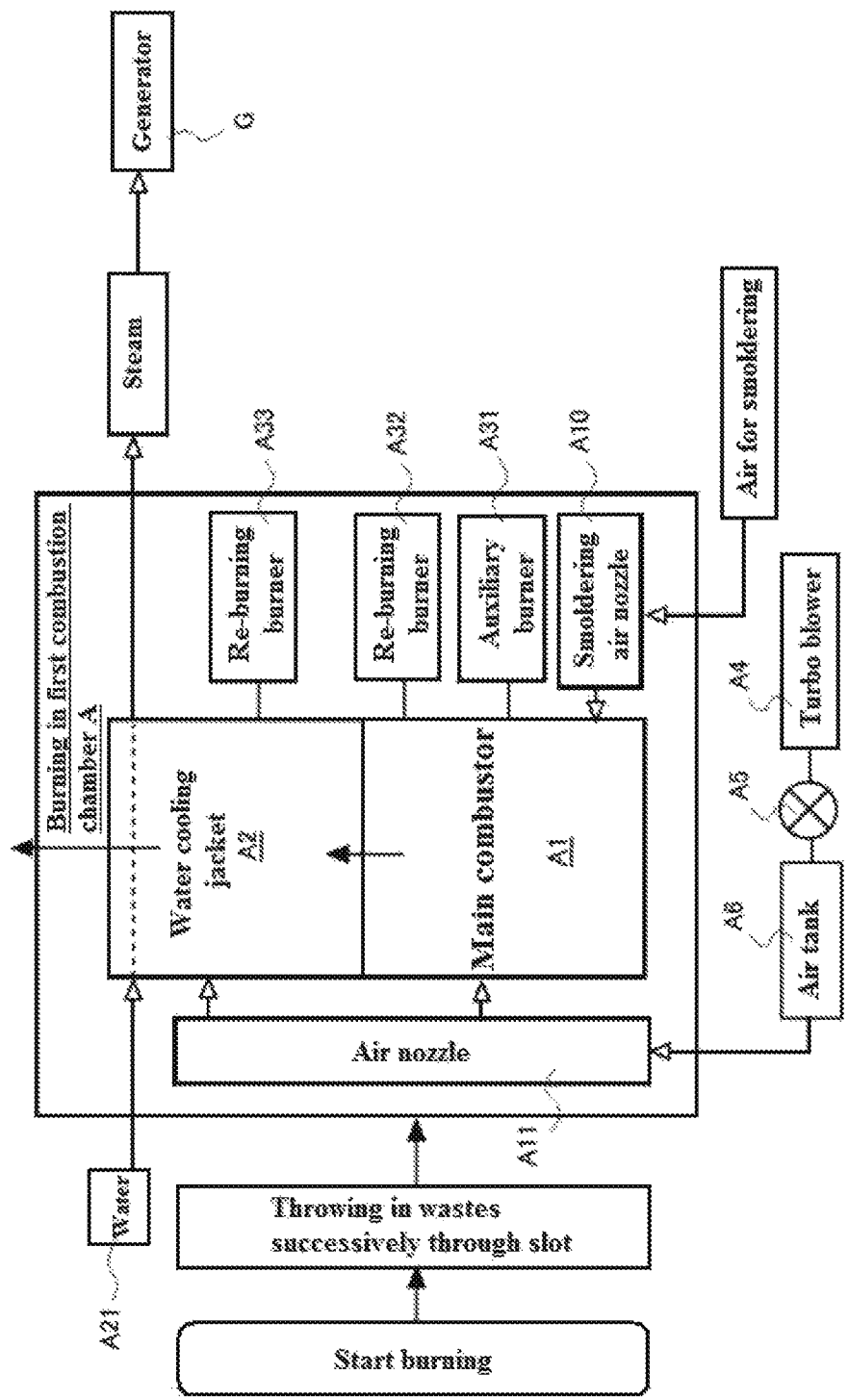
FIG. 7 is a flow chart schematically showing a first part of burning processes in the smokeless incinerator according to an embodiment of the present invention.
Figure 8:
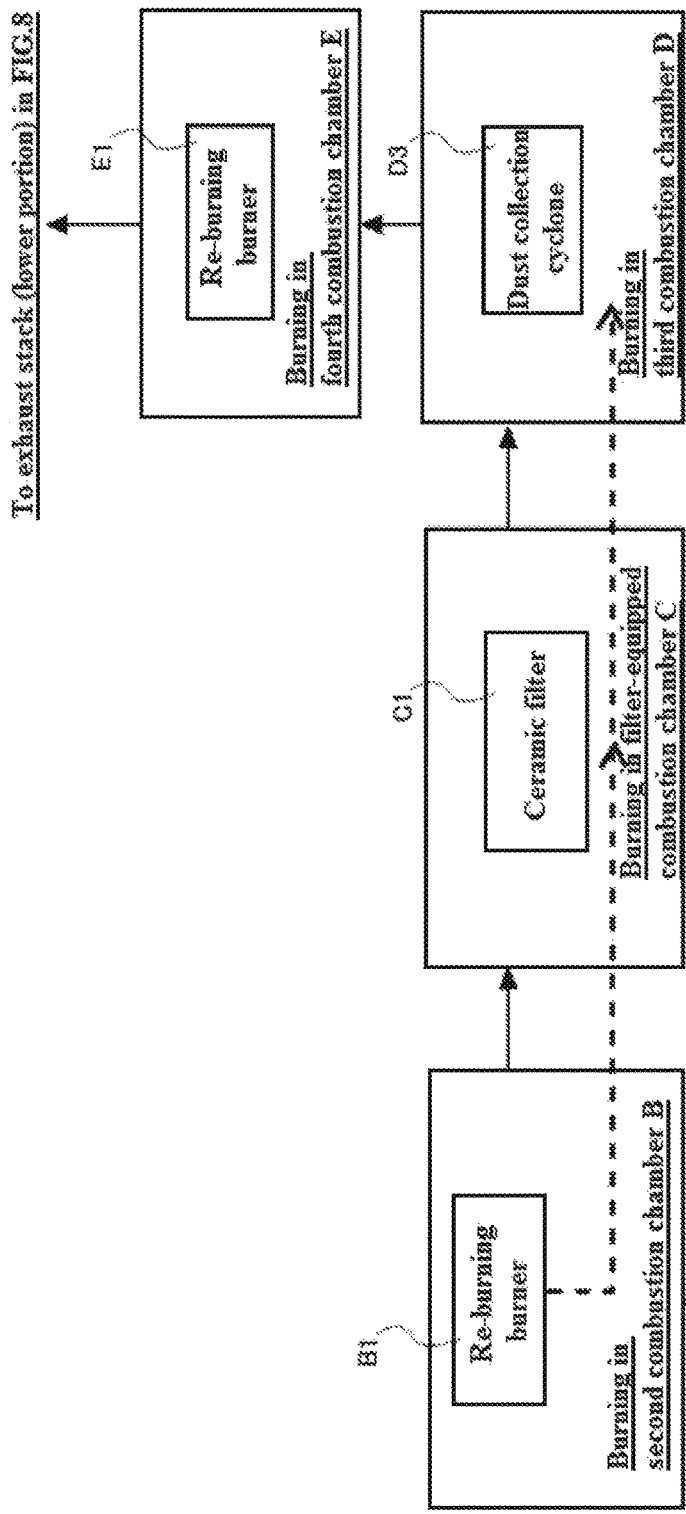
FIG. 8 is a flow chart schematically showing a second part of burning processes in the smokeless incinerator according to an embodiment of the present invention.
Figure 9:
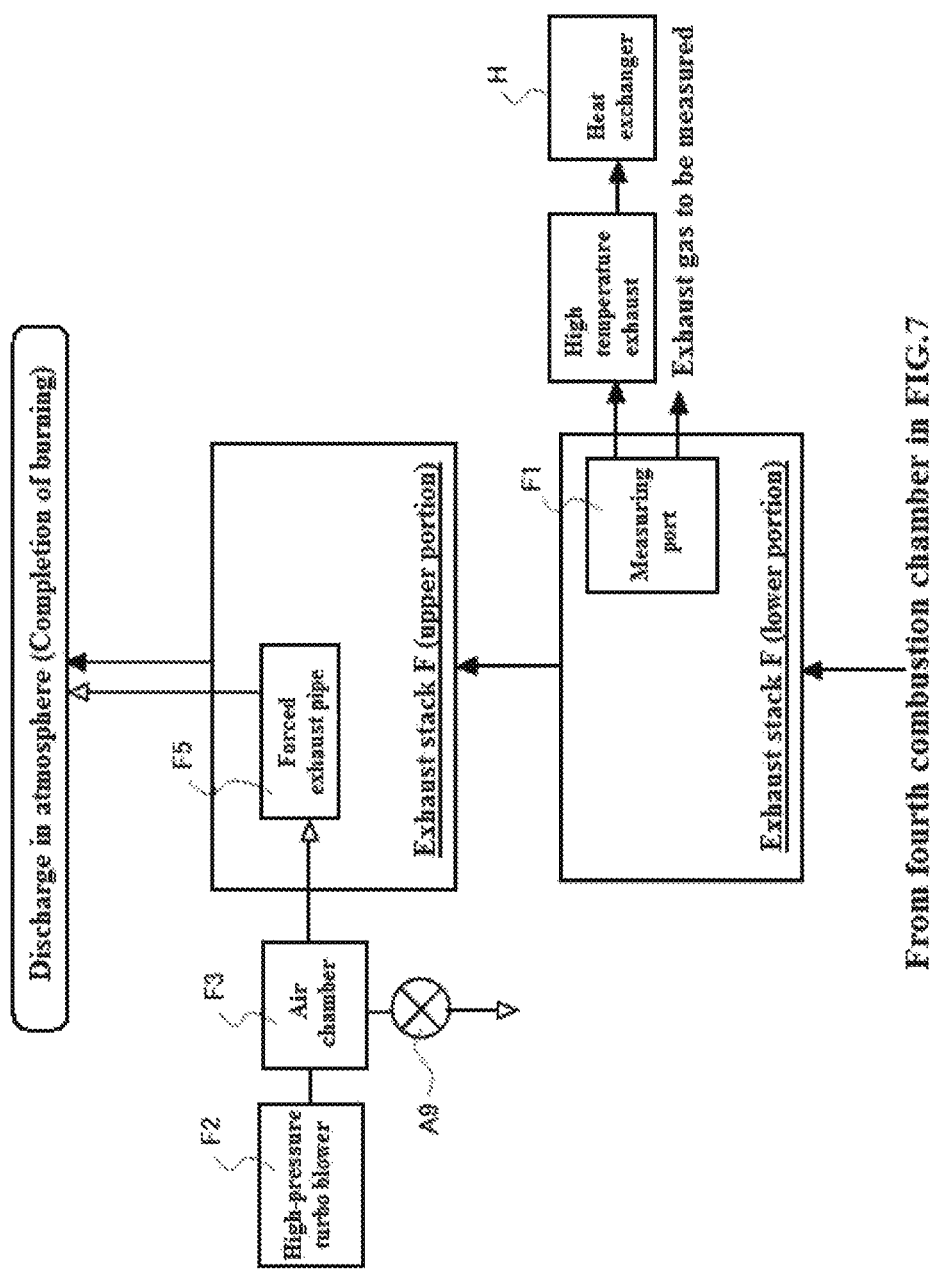
FIG. 9 is a flow chart schematically showing a third part of burning processes in the smokeless incinerator according to an embodiment of the present invention.

With reference to FIGS. 7-9, the flow of burning operations of the smokeless incinerator 1 shown in FIGS. 1-6 will be described in detail. Reference numerals of FIGS. 1-6 are used as reference in the following description.

FIG. 7 is a flow chart schematically showing from start of burning to a burning process in the first combustion chamber A. Black arrows indicate flow of wastes or exhaust gas after burning them, while white arrows indicate flow of air or water. (The same is applied to the drawings hereinafter.)

The slot A7 is opened for throwing in wastes when starting burning. It is possible to successively throw in additional wastes amid burning. As is often the case with a small incinerator, wastes are thrown in randomly. Even in this case, temperature fall does not occur amid burning in the main combustor A1 of the smokeless incinerator of the present invention. This is because the main combustor A1 is surrounded by the firebrick walls and because sufficient air is supplied from the air nozzles A11 which is controlled based on the temperature of the main combustor A1. The temperature of the main combustor A1 is measured with a temperature sensor (not shown), and its result is transmitted to the controlling section (not shown) as a basis for controlling.

The auxiliary burner A31 is used at the time of first ignition and stopped when burning is stabilized spontaneously. After this, complete burning is performed efficiently only with adequate air supply. Most of the wastes burned in the main combustor A1 are gasified and turn into exhaust gas. Incineration ash, which is solid, accumulates on the bottom of the main combustor A1 and is taken out from the ash outlet. Meanwhile, the exhaust gas contains unburned gas (carbon monoxide and other toxic gases) and floatable solid (particulates) other than carbon dioxide and water (steam), which are gasified composition resulted from complete burning.

In this case, the upper portion of the main combustor A1 and the water cooling jacket A2 function as a space for stagnation of unburned gas in the exhaust gas. The unburned gas is re-burned with the first re-burning burner A32 of the main combustor and/or the second re-burning burner A33 of the water cooling jacket A2, minimizing the amount of unburned gas in the exhaust gas as much as possible before directing to the second combustion chamber.

The water supplied to the water cooling jacket A2 may be taken out as steam, which may be used for driving the generator G as shown in FIG. 7. The generator G is, for example, a steam turbine. Such power generation technology is publicly known well. The smokeless incinerator of the present invention may be combined with this kind of generator G to configure a power generation system.

FIG. 8 is a flow chart schematically showing from the second combustion chamber B to the fourth combustion chamber E. Since the second combustion chamber B, the filter-equipped combustion chamber C, and the third combustion chamber D are sequentially aligned in a horizontal line, the re-burning burner B1 of the second combustion chamber B is capable of heating up to the filter-equipped combustion chamber C and the third combustion chamber D. Each wall of the chambers is made of porous ceramic having effects of storing and retaining heat well and radiates radiation heat (far infrared) from the wall surfaces triggered by high temperature, facilitating re-burning unburned gas in the exhaust gas. This configuration makes it possible to burn three combustion chambers with one re-burning burner, which leads to efficient use of fuel and contributes to energy saving. This step advances re-burning unburned gas and facilitates smokelessness.

Particulates in the exhaust gas are removed with both the ceramic filter C1 of the filter-equipped combustion chamber C and the dust collection cyclone D3 of the third combustion chamber D. In the dust collection cyclone of the third combustion chamber D, dust is collected under high temperature by heating so particulates are completely burned at a high rate during being collected, which contributes to smokelessness as well as to reduce ash of collected dust.

In the processes before reaching the third combustion chamber D, unburned gas in the exhaust gas is almost completely burned. If unburned gas is still left even in the fourth combustion chamber E, the re-burning burner E1 is used to re-burn the unburned gas that is detected with measurements at the measuring port provided on the lower portion of the exhaust stack.

FIG. 9 is a flow chart schematically showing the flow of exhaust gas in the exhaust stack F. Only the exhaust gas resulted from complete burning flows into the exhaust stack F and is discharged into the atmosphere with forded exhaust coming from the forced exhaust pipe F5. This completes the burning processes.

As well as being used for measurement, the exhaust gas that is taken out of the measuring port F1 provided on the lower portion of the exhaust stack F may be applied to the heat exchanger H. The temperature of the exhaust gas at this point is, for example, about 350° C., and high enough to apply to the heat exchanger H. In this case, all of the exhaust gas may be applied to the heat exchanger H instead of feeding upward in the exhaust stack F. In the heat exchanger H, exchanging heat with water brings about hot water, while exchanging with air allows to dry air and to use for hot-air heater. These heat exchange technologies are publicly known well. The smokeless incinerator of the present invention may be combined with this kind of heat exchanger H to configure a heat exchange system.

EXAMPLES

The following are the test results on the smokeless incinerator of the present invention. The incinerator used in the test has the same configuration as the above-described embodiment. The dimensions of the incinerator are:

Burning capacity: 16.191 kg/h

Hearth area: 0.29 m$^2$

Exhaust stack: 250 mm in diameter, 3.565 m in height

<Results of Dioxins Measurements>

Table 1 indicates the results of measurements that were made in conformity with JIS K 0311 (Method for Measuring Dioxins in Exhaust Gas) on samples of exhaust gas, incineration ash, and soot and dust, collected from the measuring port F1 shown in FIG. 1, the ash outlet A8 shown in FIG. 2, and the ash outlet D1 shown in FIG. 1.

TABLE 1

| Type of Sample | Collecting Point | Measured Result | Standard Value |
|---|---|---|---|
| Exhaust Gas | Measuring Port (F1) | 3.4 (ng-TEQ/m$^3_N$) | — |
| Incineration Ash | Ash Outlet (A8) | 0.0068 (ng-TEQ/g-dry) | 3 |
| Soot and Dust | Ash Outlet (D1) | 2.1 (ng-TEQ/g-dry) | 3 |

There is not a standard value set for exhaust gas in the size of tested incinerator. For reference, in the one-size larger incinerator the standard value is set as 5.

<Results of Measured Concentration of Carbon Monoxide and Oxygen>

Table 2 indicates the results of measured concentration of carbon monoxide and oxygen in the exhaust gas collected from the measuring port F1 shown in FIG. 1. Measurements were made every minute during the entire measuring time of 3 hours 46 minutes, and their mean values were calculated.

TABLE 2

| Subject | Measuring Method | Measured Result |
|---|---|---|
| Concentration of Carbon Monoxide | JIS K 0098-7.JIS B 7951 Infrared Absorption Method | 11 (ppm) |
| Concentration of Oxygen | JIS K 0301-6.JIS B 7983 Electrochemical Method | 9.6 (%) |

<Measured Results in Amount, Temperature, and Composition of Exhaust Gas>

Table 3 indicates the results of measured amount, temperature, and composition of the exhaust gas collected from the measuring port F1 shown in FIG. 1. Composition of the exhaust gas was analyzed in conformity with JIS K 0301-6. JIS B 7983 (Electrochemical Method).

TABLE 3

| | |
|---|---|
| Amount of Exhaust Gas (Humid) | 280 (m$^3_N$/h) |
| Amount of Exhaust Gas (Dry) | 250 (m$^3_N$/h) |
| Temperature of Exhaust Gas | 353° C. |
| Composition of Exhaust Gas | CO$_2$: 7.1%, O$_2$: 11.5%, CO: 0.0%, N$_2$: 81.4% |

DESCRIPTION OF THE REFERENCE NUMERAL

1 Smokeless Incinerator
A First Combustion Chamber
A1 Main Combustor
A2 Water Cooling Jacket
A31 Auxiliary Burner
A32, A33 Re-burning Burner
A4 Turbo Blower
A5 Valve
A6 Air tank
A7 Slot
A8 Ash outlet
A9 Valve
A10 Smoldering Air Nozzle
A11 Air Nozzles
A12 Firebrick Wall
A21 Water Tank
A22 Water Supply Pipe
A23 Steam Feeding Pipe
A24 Expansion Tank
A25 Steam Cylinder
A26 Water Supply Port
A27 Water Cooling Jacket Wall
B Second Combustion Chamber
B1 Re-burning Burner
B2 Porous Ceramic Wall
C Filter-equipped Combustion Chamber
C1 Ceramic Filter
C2 Porous Ceramic Wall
D Third Combustion Chamber
D1 Ash Outlet
D2 Porous Ceramic Wall
D3 Dust Collection Cyclone
E Fourth Combustion Chamber
E1 Re-burning Burner
E2 Porous Ceramic Wall
F Exhaust Stack
F1 Measuring Port
F2 High-pressure Turbo Bower
F3 Air Camber
F4 Air Feeding Pipe
F5 Forced Exhaust Pipe
G Generator
H Heat Exchanger

The invention claimed is:

1. A smokeless incinerator comprising:
 a first combustion chamber (A) provided with:
  a main combustor (A1) into which wastes are thrown having firebrick walls (A12) and an auxiliary burner (A31) for supporting burning of the wastes; and
  a water cooling jacket (A2) that is located above the main combustor (A1) and has water cooling jacket walls (A27);
 a second combustion chamber (B) that is located on top of the first combustion chamber (A) and has a re-burning burner (B1) for burning unburned gas;
 a filter-equipped combustion chamber (C) that is aligned with and adjacent to the second combustion chamber (B) and has a ceramic filter (C1);
 a third combustion chamber (D) that is aligned with and adjacent to the filter-equipped combustion chamber (C) and has a dust collection cyclone (D3);
 a fourth combustion chamber (E) that is located on top of the third combustion chamber (D) and has a re-burning burner (E1) for burning unburned gas; and
 an exhaust stack (F) that is located on top of the fourth combustion chamber (E) and has a unit of forced exhaust (F2, F5),
 wherein the re-burning burner (B1) of the second combustion chamber (B) is fixed obliquely on a side face adjacent to an opposed face to the filter-equipped combustion chamber (C) at an acute angle (α) with respect to a direction toward the filter-equipped combustion chamber (C).

2. The smokeless incinerator according to claim 1, wherein the re-burning burner (B1) of the second combustion chamber (B) is capable of heating the filter-equipped combustion chamber (C) and the third combustion chamber (D).

3. The smokeless incinerator according to claim 1, wherein the main combustor (A1) of the first combustion chamber (A) has a smoldering air nozzle (A10) at a lower portion for supplying air necessary to smolder.

4. The smokeless incinerator according to claim 1, wherein the water cooling jacket (A2) of the first combustion chamber (A) has a re-burning burner (A33).

5. A power generation system, comprising:
the smokeless incinerator (1) according to claim 1; and
a generator (G) arranged to generate electricity with steam supplied from the water cooling jacket (A2) of the first combustion chamber (A).

6. A heat exchange system, comprising:
the smokeless incinerator (1) according to claim 1; and
a heat exchanger (H) arranged to exchange heat with exhaust gas supplied from the exhaust stack (F).

7. The smokeless incinerator according to claim 2, wherein the main combustor (A1) of the first combustion chamber (A) has a smoldering air nozzle (A10) at a lower portion for supplying air necessary to smolder.

8. The smokeless incinerator according to claim 2, wherein the water cooling jacket (A2) of the first combustion chamber (A) has a re-burning burner (A33).

9. The smokeless incinerator according to claim 3, wherein the water cooling jacket (A2) of the first combustion chamber (A) has a re-burning burner (A33).

10. A power generation system, comprising:
the smokeless incinerator (1) according to claim 2; and
a generator (G) arranged to generate electricity with steam supplied from the water cooling jacket (A2) of the first combustion chamber (A).

11. A power generation system, comprising:
the smokeless incinerator (1) according to claim 3; and
a generator (G) arranged to generate electricity with steam supplied from the water cooling jacket (A2) of the first combustion chamber (A).

12. A power generation system, comprising:
the smokeless incinerator (1) according to claim 4; and
a generator (G) arranged to generate electricity with steam supplied from the water cooling jacket (A2) of the first combustion chamber (A).

13. A heat exchange system, comprising:
the smokeless incinerator (1) according to claim 2; and
a heat exchanger (H) arranged to exchange heat with exhaust gas supplied from the exhaust stack (F).

14. A heat exchange system, comprising:
the smokeless incinerator (1) according to claim 6; and
a heat exchanger (H) arranged to exchange heat with exhaust gas supplied from the exhaust stack (F).

15. A heat exchange system, comprising:
the smokeless incinerator (1) according to claim 4; and
a heat exchanger (H) arranged to exchange heat with exhaust gas supplied from the exhaust stack (F).

* * * * *